G. M. Beardsley,
Upsetting Tires,
Nº 63,691. Patented Apr. 9, 1867.
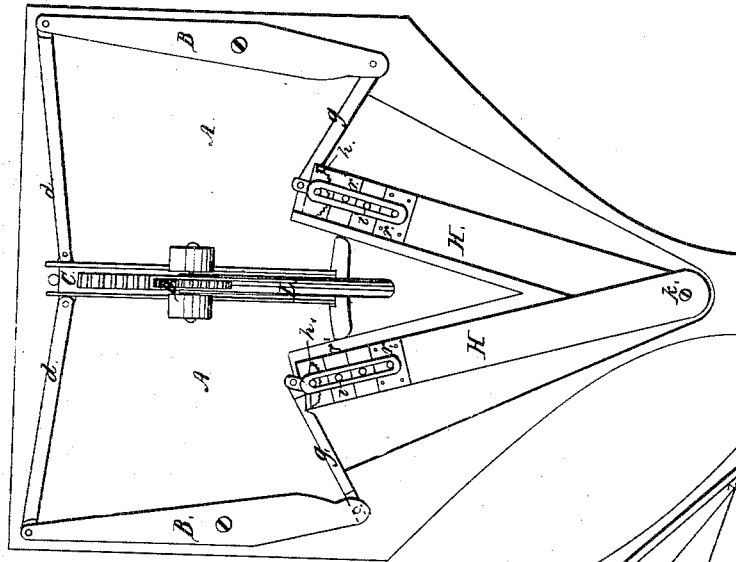
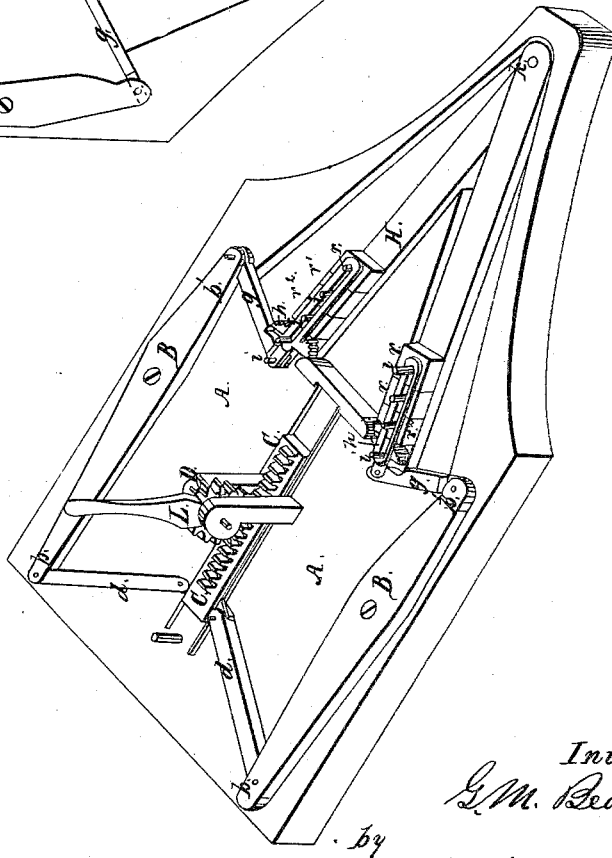
Witnesses:
Inventor:
G. M. Beardsley
by
D. P. Holloway &c.
atty.

United States Patent Office.

GEORGE M. BEARDSLEY, OF FENTONVILLE, MICHIGAN, ASSIGNOR TO HIMSELF AND C. D. BOUTELL, OF DEERFIELD, MICHIGAN.

Letters Patent No. 63,691, dated April 9, 1867.

---

IMPROVED APPARATUS FOR UPSETTING TIRES.

---

The Schedule referred to in these Letters Patent and making part of the same.

---

TO ALL WHOM IT MAY CONCERN:

Be it known that I, GEORGE M. BEARDSLEY, of Fentonville, in the county of Genesee, and State of Michigan, have invented a new and useful improvement in Machinery for Upseting or Drawing Wagon-Tire or other Iron; and I hereby declare that the following is a full, clear, and exact description of the same, reference being had to the accompanying drawings, forming part of this specification, in which—

Figure 1 is a perspective view.
Figure 2 is a plan view.
Similar letters of reference indicate corresponding parts in the several figures.

The design of my invention is to produce a substantial, convenient, and practical machine for either drawing or upsetting bars of iron, and it is especially designed and adapted to the use of "setting" wagon tire. It consists, first, in the employment of the knee or toggle-joint as a means for multiplying the power exerted upon the handle so as to either draw or upset the heated tire when it is placed in the jaws of the clamp; second, in the method of clamping the tire, so that the clamping device is self-acting; and third, in the method of constructing and operating the clamping devices, so that tire of any diameter will be firmly held in the same without being sprung out of the true circle.

A A A is the bed, to which are attached, by pins $a$ $a$, two arms B B. The front ends $b$ of the arms B are connected by two rods, $d$ $d$, to a sliding rack, C, there being two ears $e$ $e$ attached to the front end of the said rack C, to which the inner ends of the rods $d$ are pivoted. The rack C is operated by a pinion, D, to which is attached the motive lever L. Two other rods, $g$ $g$, are pivoted to the rear ends $b'$ of the arms B. H H are two arms swinging on a common centre, $k$. The forward ends of the arms H are attached to the inner ends of the rods $g$ by means of lever-cams $h$ $h$, as shown in the drawings, by means of pins $i$ and pins $o$, (shown more clearly in fig. 3.) $r$ $r$ are two fixed jaws firmly attached to the arms H H. These jaws are united with the pins $i$, projecting from the cams $h$, by links. Intermediate between the fixed jaws $r$ and the cams $h$ are movable jaws $r^1$ and $r^2$. These may be increased in number as may be desired; they should be notched and curved on their faces to suit the curvature of the tire. These intermediate jaws also are provided with pins which pass through the links by which they are held in place, and they seize the tire placed between them by the pressure of the cams $h$ communicated through the series. To determine in any given case which jaws are the proper ones for any particular sized tire, it is only necessary to find the diameter of the tire and then place the same between the jaws that are as far from the centre $k$ as the semi-diameter of the tire to be set. And in order to make this adaptation perfect, the jaws $r$, $r^1$, and $r^2$ are made curving, in the shape that would be determined by drawing a circle around the centre $k$, of such radius as would just pass between the faces of the said jaws. I make in this case two of these movable jaws $r$ and $r^1$, but it is plain that any desired number may be employed, so as to adapt the machine to any desired size of tire. I keep the movable jaws in place by means of pins passing through each jaw, and extending down into a recess cut in the arms H, and passing up also through a link that is placed over all of them, and that helps to hold the cams $h$ firmly against the jaws $r^2$.

The operation of the machine is as follows: Supposing a wagon tire, O, is to be reset, the lever L is turned down as shown in fig. 2, the links over the jaws $r$ $r^1$ $r^2$, are removed, and the tire is inserted between the cams $h$ and the jaws $r^2$, or else between such of the jaws as fit the circle of the tire. The links are then replaced, as shown in fig. 2. The lever or handle L is then raised. As it rises, the pinion D moves out and carries with it the inner ends of the rods $d$ $d$, and as a consequence throws the ends $b$, of the arms B, apart, and also the ends $b'$, of the said arms B, are brought toward each other. Now, since the rods $g$ are attached to the arms B, at $b'$, and since they are also attached by pins $i$ $i$ to the cams $h$, and as the cams $h$ are also attached by pins $o$ $o$ to the arms H H, it follows that as the rods $g$ $g$ move towards each other the cams $h$ will turn on the pins $o$ until the inner edges of such cams press against the face of the tire, or, if the tire is between two jaws, then the inner edge of the cams $h$ will press against the jaws $r^2$, and will firmly clamp the tire. The lever L is raised still further, and (the tire O being heated red hot,) the portion of the tire between the two cams $h$ will be compressed or upset.

The operation of drawing or expanding tire or other iron is simply the reverse of that just described, the lever L being in the position shown in fig. 1, when the tire or other article is placed within the jaws of the clamps, and the said handle or lever L is moved toward the operator. The machine represented in the drawings hereto annexed is made more especially for upsetting tire, but it is plain that it will draw iron with good degree of success; or, if a machine be designed especially for drawing iron, the arms B would want to turn on pins at the end $b$, while the rods $d\ d$ would want to be connected to the arms B at about the same point as that occupied in the present case by the pins $a\ a$, so that the rods $g\ g$ would be moved apart as the rods $d\ d$ approach in line one with the other. The rack and pinion may be placed in any desired relative position by simply removing the pin $p$ that retains the pinion in place. It will be seen that the form of the cams $h$ is such that if the rods $g$ are moved towards each other the said cams will turn on the pins $o$ until the inner edges of said cams clamp the tire; while if the rods $g$ are thrown apart, the said cams will turn on the pins $o$ until their outer edges will clamp the tire, so that by the simple arrangement of a T-shaped or lever-cam having two pivots, the clamping is self-acting, either for drawing or upsetting of the tire.

What I claim as my invention, and desire to secure by Letters Patent, is—

1. In combination with the lever $d$, and a device for operating the same, I claim the lever B, rods $g$, and cams $h$, when the latter are used in connection with movable or stationary jaws $r\ r^1\ r^2$ on the arms H, substantially in the manner and for the purpose set forth.

2. I claim the self-clamping lever-cams $h$, in combination with the jaws $r$, forming a clamping device, as herein described.

3. I claim the movable jaws $r^1\ r^2$, in combination with the arms H H, swinging upon the same centre, for the purpose herein set forth.

GEORGE M. BEARDSLEY.

Witnesses:
C. H. TURNER,
A. R. BARRETT.